United States Patent [19]

Kuhlthau

[11] 4,042,322
[45] Aug. 16, 1977

[54] PROCESS FOR DYEING ANIONICALLY MODIFIED SYNTHETIC FIBER MATERIALS

[75] Inventor: Hans-Peter Kühlthau, Leverkusen, Germany

[73] Assignee: Bayer Aktiengesellschaft, Leverkusen, Germany

[21] Appl. No.: 700,893

[22] Filed: June 29, 1976

Related U.S. Application Data

[62] Division of Ser. No. 564,104, is a division of Ser. No. 299,658, Oct. 24, 1972, Pat. No. 3,925,015.

[30] Foreign Application Priority Data

Oct. 23, 1971 Germany .............................. 2152948

[51] Int. Cl.$^2$ .............................................. D06P 5/00
[52] U.S. Cl. ..................................... 8/168 R; 8/41 A; 8/94 A; 8/172 R; 8/174; 8/177 AB
[58] Field of Search ............. 8/168, 41 A, 124, 168 R, 8/168 A, 168 B, 168 CA, 41 A, 41 B, 41 C, 174, 177 AB, 94 A

[56] References Cited

U.S. PATENT DOCUMENTS

| | | | |
|---|---|---|---|
| 3,630,663 | 12/1971 | Hildebrand et al. | 8/172 |
| 3,667,898 | 6/1972 | Bergman et al. | 8/94 |
| 3,741,982 | 6/1973 | Fujino et al. | 260/326 |
| 3,980,430 | 9/1976 | Kuhlthau | 8/168 R |

FOREIGN PATENT DOCUMENTS

2,043,192   3/1971   Germany

*Primary Examiner*—Joseph L. Schofer
*Assistant Examiner*—A. L. Clingman
*Attorney, Agent, or Firm*—Plumley & Tyner

[57] ABSTRACT

Exhaustion process for dyeing automatically modified fibre materials with cationic dyestuffs from halogenated hydrocarbons, wherein are used cationic dyestuffs of the formula $$[F - (R)_z]^+ A^-$$

in which F, R, z and A$^-$ have the meaning given below in the disclosure; by the claimed process an essentially improved exhaustion of the dyebaths is achieved.

3 Claims, No Drawings

PROCESS FOR DYEING ANIONICALLY MODIFIED SYNTHETIC FIBER MATERIALS

This is a division of application, Ser. No. 564,104, filed Apr. 1, 1975, now U.S. Pat. No. 3,980,430 which is a Division of Ser. No. 299,658 filed Oct. 24, 1972 now U.S. Pat. No. 3,925,015.

The invention relates to an exhaustion process for dyeing anionically modified synthetic fibre materials with cationic dyestuffs; more particularly it concerns an exhaustion process for dyeing anionically modified synthetic fibre materials with cationic dyestuffs from halogenated hydrocarbons, wherein are used as cationic dyestuffs of the formula $$[F=(R)_z]^+ A^- \quad (I)$$

in which
F represents the radical of a dyestuff cation possessing at least one aromatic or hetero-aromatic ring,
R denotes a $C_1$–$C_{12}$-alkyl, $C_3$–$C_{12}$-alkoxy or $C_5$–$C_6$-cycloalkyl group, preferably a $C_4$–$C_7$-alkyl, $C_4$–$C_7$-alkoxy or $C_5$–$C_6$-cycloalkyl group,
z is 1, 2 or 3 and
A— is an anion,
with the proviso that the radical or radicals R are bonded to aromatic and/or hetero-aromatic ring systems of the dyestuff cation and that if R is a $C_1$–$C_2$-alkyl group, z is 3 and the 3 R are located on one and the same aromatic or hetero-aromatic ring.

As examples of R there may be mentioned: as $C_1$–$C_{12}$-alkyl radicals, the methyl, ethyl, n-propyl, i-propyl, n-butyl, i-butyl, t-butyl, n-pentyl, 2-methylbutyl, pentyl-(2), pentyl-(3), n-hexyl, hexyl-(2), hexyl-(5), n-heptyl, heptyl-(2), heptyl-(3), heptyl-(4), n-octyl, octyl-(2), octyl-(3), octyl-(4), n-nonyl, nonyl-(2), n-decyl, decyl-(2), n-undecyl, undecyl-(2), n-dodecyl and dodecyl-(2) radical; as $C_3$–$C_{12}$-alkoxy radicals the n-propoxy, i-propoxy, n-butoxy, i-butoxy, tert.butoxy, n-pentoxy, i-pentoxy, n-hexoxy, hexyl-(2)-oxy, n-heptoxy, heptyl(3)-oxy, n-octyloxy, octyl-(2)-oxy, octyl-(4)-oxy, n-nonyloxy, nonyl-(2)-oxy, n-decyl, decyl-(2)-oxy, n-undecyloxy, undecyl-(2)-oxy, n-dodecyloxy and dodecyl-(2)-oxy radical; and as $C_5$–$C_6$-cycloalkyl radicals the cyclopentyl and cyclohexyl radical.

Possible anions A— are especially the anions of inorganic or organic acids which are customary for basic dyestuffs. As examples there may be mentioned: as anions of inorganic acids, the chloride, bromide, iodide, carbonate, bicarbonate, sulphate, bisulphate, disulphate, aminosulphonate, phosphate, dihydrogenophosphate, nitrate and perchlorate ion and also $ZnCl_3^-$; as anions of aliphatic and aromatic sulphonic acids or acid sulphuric acid esters such as the methanesulphonate, benzenesulphonate, p-toluenesulphonate, p-chlorobenzenesulphonate, methylsulphate and ethylsulphate ion, and as anions of organic acids the anion of formic acid, acetic acid, chloroacetic acid, propionic acid, lactic acid, crotonic acid, benzoic acid, oxalic acid, malonic acid, maleic acid, citric acid, tartaric acid, succinic acid, adipic acid and suberic acid.

Dyestuffs of the formula I in which the radical R contains 4 to 7 C atoms, for example dyestuffs which contain one to three tert.-butyl or heptyl-(3) radicals, are preferred.

Dyestuffs which have proved particularly valuable are those of the formula I wherein the dyestuff cation

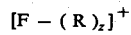

is

A. a dyestuff cation of the formula

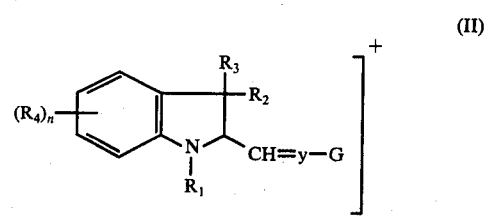

in which
$R_1$ denotes hydrogen, alkyl, cycloalkyl, aralkyl or aryl,
$R_2$ denotes $C_1$–$C_5$-alkyl, cycloalkyl or aralkyl,
$R_3$ denotes $C_1$–$C_5$-alkyl, cycloalkyl or aralkyl,
$R_4$ denotes halogen, alkyl, cycloalkyl, aralkyl, alkoxy, nitro, carbalkoxy, nitrile, acyl, acylamino, amino, carbamoyl, N-alkyl-carbamoyl, N,N-dialkylcarbamoyl, N-alkyl-N-arylcarbamoyl, sulphamoyl, N-alkylsulphamoyl,
N,N-dialkylsulphamoyl, alkylsulphonyl, arylsulphonyl, trifluoromethyl, aryloxy, aralkoxy or carbaralkoxy,
y represents —CH= or —N= and
G represents the radicals

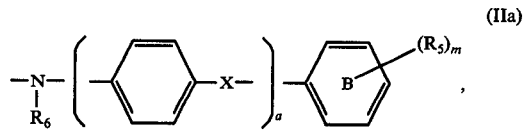

or

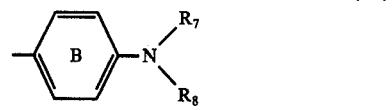

or

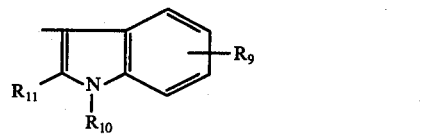

or

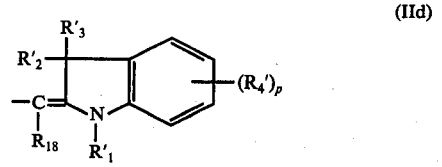

in which
$R'_1$ denotes hydrogen, alkyl, cycloalkyl, aralkyl or aryl,
$R'_2$ denotes $C_1$–$C_5$-alkyl, cycloalkyl or aralkyl,
$R'_3$ denotes $C_1$–$C_5$-alkyl, cycloalkyl or aralkyl,
$R'_4$ denotes halogen, alkyl, cycloalkyl, aralkyl, alkoxy, nitro, carbalkoxy, nitrile, acyl, acylamino, amino, carbamoyl, N-alkyl-carbamoyl, N,N-dialkylcarbamoyl, N-alkyl-N-arylcarbamoyl, sulphamoyl, N-alkylsulphamoyl, N,N-dialkylsulphamoyl, alkylsulphonyl, arylsulphonyl, trifluoromethyl, aryloxy, aralkoxy or carbaralkoxy, R₅ represents halogen, alkyl, cycloalkyl, aralkyl, alkoxy, nitro, carbalkoxy, nitrile, acyl, acylamino, amino, carbamoyl, N-alkyl-carbamoyl, N,N-dialkylcarbamoyl, N-alkyl-N-arylcarbamoyl, sulphamoyl, N-alkylsulphamoyl, N,N-dialkylsulphamoyl, alkylsulphonyl, arylsulphonyl, trifluoromethyl, aryloxy, aralkoxy or carbaralkoxy, $R_6$ denotes hydrogen; a lower alkyl which is optionally substituted, for example by $C_1$–$C_5$-carbalkoxy or $C_1$–$C_5$-alkoxy; an alkyl radical which in the o-position of the ring B, if a = o, can close a 5-membered or 6-membered ring, the heterocyclic ring thereby formed being optionally alkyl-substituted or condensed with a further carbocyclic ring; cycloalkyl, aralkyl or $C_1$–$C_5$-alkenyl;

$R_7$ is hydrogen; alkyl, which can optionally close a 5-membered or 6-membered ring to the adjacent o-position of the ring B, the heterocyclic ring thereby formed being optionally alkyl-substituted or fused to a further carbocyclic ring; cycloalkyl; aralkyl or aryl;

$R_8$ hydrogen, alkyl or aralkyl; $R_7$ and $R_8$ can further, with the nitrogen atom, close a heterocyclic ring which can optionally contain further hetero-atoms;

$R_9$ hydrogen, alkyl, alkoxy or halogen, $R_{10}$ hydrogen, alkyl, aralkyl, cycloalkyl or aryl, $R_{11}$ alkyl, aryl, carboxylic acid ester or an optionally substituted carbonamide group;

$R_{18}$ hydrogen, nitrile, carboxylic ester or carbonamide,

X represents —CH₂— or O, a represents the numbers 0 or 1 and m, n and p independently of one another represent a number from 0 to 3, with the proviso that at least one of the substituents $R_4$, $R_4'$, $R_5$, $R_9$ or $R_{11}$ is a $C_3$–$C_{12}$-alkyl, $C_3$–$C_{12}$-alkoxy or $C_5$–$C_6$-cycloalkyl group or $R_{10}$ is a $C_3$–$C_{12}$-alkyl or $C_5$–$C_6$-cycloalkyl group or $R_4$, $R_4'$ or $R_5$ is a $C_1$–$C_2$-alkyl group, in which case n, p or m have the value 3.

Dyestuffs of the formula II in which $R_4$ represent a t-butyl group in the 5-position and/or $R_5$ represents a t-butyl group in the p-position and/or $R_9$ represents a t-butyl group in the 5-position are particularly preferred.

B. A dyestuff cation of the formula

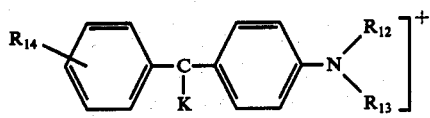

(III)

in which $R_{12}$ represents hydrogen, alkyl, aralkyl, cycloalkyl or aryl, $R_{13}$ represents hydrogen, alkyl, cycloalkyl or aralkyl, or $R_{12}$ and $R_{13}$ together with the nitrogen atom form a heterocyclic ring which can optionally contain further hetero-atoms, $R_{14}$ can represent hydrogen, halogen, alkoxy, aralkoxy, aryloxy, acyloxy, alkyl, aralkyl, aryl, nitro, nitrile, trifluoromethyl, carboxylic acid ester, optionally N-substituted carbonamide groups, acyl, alkylsulphonyl or arylsulphonyl or

with $R_{15}$ and $R_{16}$ having the meaning given below, and K represents the radicals

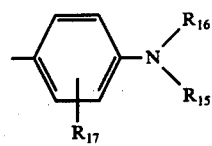

(IIIa)

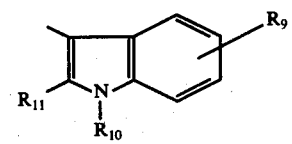

(IIIb)

in which $R_9$, $R_{10}$ and $R_{11}$ have the abovementioned meanings;

$R_{15}$ represents hydrogen, alkyl, cycloalkyl or aralkyl;

$R_{16}$ represents hydrogen, alkyl, aralkyl, cycloalkyl or aryl or $R_{15}$ and $R_{16}$, together with the nitrogen atom, form a heterocyclic ring which can optionally contain further hetero-atoms; and $R_{17}$ denotes hydrogen, halogen, alkyl or alkoxy, with the proviso that at least one of the substituents $R_9$, $R_{11}$, $R_{14}$ or $R_{17}$ is a $C_3$–$C_{12}$-alkyl, $C_3$$C_{12}$-alkoxy or $C_5$–$C_6$-cycloalkyl group or $R_{10}$ is a $C_3$–$C_{12}$-alkyl or $C_5$–$C_6$-cycloalkyl group.

Dyestuffs of the formula III in which either $R_{14}$ represents a tert. butyl group in the p-position and/or $R_9$ represents a tert. butyl group in the 5-position are particularly preferred.

The aromatic carbocyclic rings of the dyestuff cations II and III can be fused to carbocyclic rings and can also contain, additionally to the substituents $R_4$, $R_4'$, $R_5$, $R_9$, $R_{14}$ and $R_{17}$, further non-ionic substituents such as fluorine, chlorine or bromine atoms and also methyl, ethyl, methoxy, carbomethoxy, nitro and nitrile groups.

The aryloxy, aralkoxy, carbaralkoxy and aralkyl radicals can be substituted in the aromatic radical, especially by lower alkyl, halogen, such as fluorine, chlorine or bromine, alkoxy, carboalkoxy, nitrile, nitro and/or hydroxyl.

As examples of the groups or radicals named in the definitions, there may be mentioned:

As lower alkyl groups: $C_1$–$C_5$-alkyl groups, such as methyl, ethyl, n-propyl, iso-propyl, n-butyl, i-butyl, t-butyl an iso-amyl.

As alkyl groups: $C_1$–$C_{12}$-alkyl groups, such as have been listed for R, and also lower substituted alkyl radicals such as the 2-cyanoethyl, 2-chloroethyl and 2-hydroxyethyl radical;

Alkoxy represents methoxy, ethoxy or larger alkoxy radicals, such as are described for the radical R;

Carbalkoxy in particular represents carbomethoxy, carboethoxy, carbopropoxy and carbobutoxy;

Acyl radicals are especially the acetyl, propionyl, benzoyl and toluyl radical;

Suitable acylamino radicals are, for example, the formylamino, acetylamino, n-propionylamino, benzoylamino, 4-chlorobenzoylamino and 4-methylbenzoylamino radical.

As examples or aralkyl radicals there may be mentioned: the benzyl, β-phenylethyl and α,α-dimethylbenzyl radical as well as their derivatives substituted in the phenyl nucleus.

As cycloalkyl, cyclohexyl is of particular importance.

Aryl represents carbocyclic aromatics with 6–10 carbon atoms such as phenyl and naphthyl and their derivatives such as 4-methylphenyl, 2-methylphenyl, 4-chlorophenyl, 2-chlorophenyl and 2-methyl-4-chlorophenyl.

N-alkyl-carbamoyl and N,N-dialkyl-carbamoyl represent, for example, methyl-carbamoyl, N-ethyl-carbamoyl, N-n-butyl-carbamoyl, N,N-dimethyl-carbamoyl, N,N-diethyl-carbamoyl and N-methyl-N-ethyl-carbamoyl.

N-alkyl-N-aryl-carbamoyl represents, for example, N-methyl-N-phenyl-carbamoyl and N-ethyl-N-phenyl-carbamoyl.

N-alkyl-sulphamoyl and N,N-dialkyl-sulphamoyl represent, for example, N-methyl-sulphamoyl, N-ethyl-sulphamoyl, N,N-dimethyl-sulphamoyl and N,N-diethyl-sulphamoyl.

As aryloxy radicals there should be mentioned, for example: the phenoxy and naphthoxy radical and their derivatives which are substituted in the aromatic ring.

Suitable aralkoxy radicals are, for example, benzyloxy, phenylethoxy, α,α-dimethylbenzyloxy and their derivatives which are optionally substituted in the phenyl nucleus. Carbaralkoxy radicals are, for example, carbobenzoxy, carbo-α-phenylethoxy, carbo-(β-phenylethoxy) and carbo-(γ-phenyl-n-propoxy) radicals and their derivatives substituted in the phenyl nucleus.

The dyestuffs to be used according to the invention are manufactured in accordance with processes which are in themselves known. These are described, for example, in German Patent Specifications Nos. 686,198 and 742,039 or British Pat. Nos. 840.282, 875.995 or 1.139.4077. The dyestuffs which according to the invention, are added to the halogenated hydrocarbon dye baths can vary within wide limits depending on the desired depth of colour; in general, amounts of 0.1–8 percent by weight, relative to the weight of the material to be dyed which is employed, have proved successful.

It has proved advantageous to add to the halogenated hydrocarbon dyeing liquors small amounts, for example 0.1–4, preferably 0.1–2, % by weight of water, relative to the weight of the halogenated hydrocarbon. At the same time it has proved advantageous also to add to the halogenated hydrocarbon solutions, for distillation of the water, emulsifiers in an amount of 0.1—2% by weight relative to the weight of the halogenated hydrocarbon. Possible emulsifiers are preferably non-ionic compounds; oxethylation products of fatty alcohols, phenols, fatty acid amides and fatty acids, as well as their mixtures, have proved successful.

The anionically modified synthetic fibre materials to be dyed according to the invention are in particular polyacrylonitrile modified by carboxyl and/or sulphonic acid groups, polyesters modified by carboxyl and/or sulphonic acid groups, such as polyethylene terephthalate, polycyclohexanedimethylene terephthalate, heterogeneous polyesters of terephthalic acid, isophthalic acid and ethylene glycol or of terephthalic acid, sulphoisophthalic acid and ethylene glycol, and also copolyether-ester fibres from p-hydroxybenzoic acid, terephthalic acid and ethylene glycol, or polyamides such as polyhexamethylene adipate, polycaprolactam or poly-ω-aminoundecanoic acid, modified by sulphonic acid groups. These anionically modified, synthetic fibre materials can, during dyeing, also be present as a mixture with unmodified synthetic fibre materials. The unmodified fibre component is not dyed by the cationic dyestuffs can can subsequently by dyed with another non-cationic dyestuff.

Dyeing of the anionically modified, synthetic fibre materials from chlorinated hydrocarbon solutions, which is preferably effected in closed apparatuses, can take place, for example, by introducing the fibre materials, at room temperature, into the chlorinated hydrocarbon dyeing liquors which contain the cationic dyestuffs and advantageously small amounts of water, as well as the optionally used emulsifiers, heating the bath to temperatures of 70°–140° C and keeping it at this temperature until the liquor is exhausted. After cooling, the liquor is separated off. The fibre materials are optionally briefly rinsed with fresh solvent, and are freed of the adhering solvent by suction filtration or centrifugation and subsequent drying in a stream of air.

Using the process according to the invention, it proves possible to dye anionically modified, synthetic fibre materials, in the most diverse states of processing, for example as flocks, tows, yarn, piece goods, pile fabrics or made-up goods, by means of cationic dyestuffs from chlorinated hydrocarbon solutions, to give deep shades of excellent evenness. The dyeings obtained have very good rub resistance. The exhaustion of the bath is very good in the process according to the invention.

Halogenated hydrocarbons which can be used for the process according to the invention are those of boiling point between 40° and 170° C, especially aliphatic chlorinated hydrocarbons, such as methylene chloride, chloroform, carbon tetrachloride, 1,1-dichloroethane, 1,2-dichloroethane, 1,12-trichloroethane, 1,1,1,2-tetrachloroethane, 1,1,2,2-tetrachloroethane, pentachloroethane, 1-chloropropane, 2-chloropropane, 1,2-dichloropropane, 1-chlorobutane, 2-chlorobutane, 1,4-dichlorobutane, 1-chloro-2-methylpropane or 2-chloro-2-methylpropane as well as aliphatic fluoro- and fluorochloro-hydrocarbons, such as perfluoro-n-hexane, 1,2,2-trifluorotrichloroethane and trifluoropentachloropropane and aromatic chlorinated hydrocarbons and fluorinated hydrocarbons, such as chlorobenzene, fluorobenzene, chlorotoluene and benzotrifluoride.

Tetrachloroethylene, trichloroethylene and 1,1,1-trichloropropane have been proved particularly successful.

The cationic dyestuffs of the formula I to be used according to the invention are distinguished by good solubility in halogenated hydrocarbons, for example tetrachloroethylene.

An exhaustion process for dyeing synthetic fibre materials, containing anionic groups, by means of cationic dyestuffs from halogenated hydrocarbons is already known from British Pat. No. 1,234,727.

The process according to the invention differs from this process in that in it cationic dyestuffs are used which possess a dyestuff cation which is soluble in chlorinated hydrocarbons, whilst according to the process of the German Offenlegungsschrift (German Published Specification) cationic dyestuffs are used which are rendered soluble in chlorinated hydrocarbon by the introduction of a lipophilic anion.

This difference in the conversion of water soluble cationic dyestuffs into cationic dyestuffs which are soluble in chlorinated hydrocarbons is very important technologically.

Using the cationic dyestuffs to be employed according to the invention, better bath exhaustion is achieved, because of the absence of retarding anions, than with the dyestuffs described in British Pat. No. 1.234.727. As a result, no difficulties in levelling occur when dyeing with combinations of different cationic dyestuffs of the formula I such as is often the case when dyeing with the cationic dyestuffs described in the British Patent.

With the aid of the dyestuffs to be used according to the invention, level, reproducible dyeings are obtained in a simple manner even when dyeing with dyestuff combinations.

The parts indicated in the examples which follow are parts by weight, unless otherwise stated.

EXAMPLE 1

Fibre yarn of anionically modified polyacrylonitrile is introduced, in a liquor ratio of 1:10, into a dye bath which per litre of tetrachloroethylene contains 1 g of the dyestuff of the formula

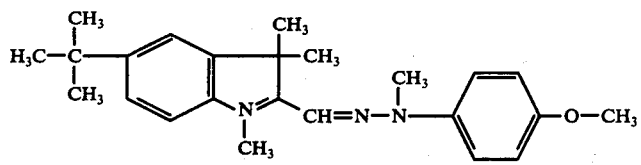

1 g of oleic acid ethanolamide, 1 g of the reaction product of 1 mol of oleyl alcohol with 20 mols of ethylene oxide, 8 g of water and 1 g of glacial acetic acid. The dye bath is heated in a closed dyeing machine to 100° C for 60 minutes, with vigorous agitation of the liquor. Thereafter the yarn is rinsed with fresh solvent and dried. A golden yellow dyeing of excellent fastness properties is obtained.

The dyestuff employed had been manufactured as follows: 5.2 parts of p-anisidine in 100 parts of water were diazotised, in the presence of 15.5 parts of 30% are strength hydrochloric acid, with a solution of 2.95 parts of sodium nitrite in 15 parts by volume of water. After destroying the excess nitrite with amidosulfphonic acid, 9.7 parts of 1,3,3 trimethyl-2-methylene-5-tertiary butyl-2,3-dihydroindole were added at 5° C. A solution of 12.5 parts of sodium acetate trihydrate in 50 parts of water was then added dropwise over the course of 1 hour. After the temperature had risen to 20° C, the resulting dyestuff was salted out. After being filtered off, it was stirred into a mixture of 200 parts by volume of chlorobenzene and 100 parts of water at 80° C, whilst at the same time keeping the pH value of the aqueous layer at pH 9–10 by adding sodium hydroxide solution. After stirring for a further 15 minutes, the organic layer was separated off, 1.7 parts of triisopropanolamine were added and the dehydration was effected by distilling off about 30 parts by volume of liquid at approx. 80° C under reduced pressure. 7 parts of dimethyl sulphate were then added dropwise at 80° C and the mixture was further stirred until the methylation was complete. After stripping off the chlorobenzene in steam, the dyestuff was isolated by salting out with sodium chloride from the aqueous distillation residue.

Equivalent dyeings, in the colour shades indicated in the table, were also obtained if instead of the dyestuff used the same amount of one of the dyestuffs obtained in the reaction of the dihydroindoles and anilines indicated in the table, under the manufacturing conditions described for the dyestuff used, was employed.

Table

| Dihydroindole | Aniline | Colour Shade |
| --- | --- | --- |
| 1,3,3-Trimethyl-2-methylene-2,3-dihydroindole | p-tertiary-Butylaniline | yellow |
| 1,3,3-Trimethyl-2-methylene-2,3-dihydroindole | 2,4,5-Trimethylaniline | yellow |
| 1,3,3-Trimethyl-2-methylene-2,3-dihydroindole | p-i-Butoxyaniline | golden yellow |
| 1,3,3-Trimethyl-2-methylene-2,3-dihydroindole | p-n-Butoxyaniline | golden yellow |
| 1,3,3-Trimethyl-2-methylene-2,3-dihydroindole | p-(2-Methyl-butoxy)-aniline | golden yellow |
| 1,3,3-Trimethyl-2-methylene-2,3-dihydroindole | p-Heptyl (3)-oxy-aniline | golden yellow |
| 1,3,3-Trimethyl-2-methylene-2,3-dihydroindole | p-Hexyloxy-aniline | golden yellow |
| 1,3,3-Trimethyl-2-methylene-5-tertiary-butyl-2,3-dihydroindole | p-i-Propoxyaniline | golden yellow |
| 1,3,3-Trimethyl-2-methylene-5-tertiary-butyl-2,3-dihydroindole | p-Benzyloxyaniline | golden yellow |
| 1,3,3-Trimethyl-2-methylene-5-tertiary-butyl-2,3-dihydroindole | p-tertiary-Butylaniline | yellow |
| 1,3,3-Trimethyl-2-methylene-5-tertiary-butyl-2,3-dihydroindole | 4-Aminodiphenyl-ether | golden yellow |
| 1,3,3-Trimethyl-7-phenoxy-2-methylene-2,3-dihydroindole | tert.-Butylaniline | golden yellow |
| 1,3,3-Trimethyl-5-phenoxy-2-methylene-2,3-dihydroindole | tert.-Butylaniline | golden yellow |
| 1,3,3-Trimethyl-7-benzyloxy-2-methylene-2,3-dihydroindole | tert.-Butylaniline | golden yellow |
| 1,3,3-Trimethyl-5-n-butoxy-2-methylene-2,3-dihydroindole | p-Anisidine | golden yellow |
| 1,3,3-Trimethyl-5-n-butoxy-2-methylene-2,3-dihydroindole | p-Toluidine | golden yellow |
| 1,3,3-Trimethyl-5-methyl-2-methylene-2,3-dihydroindole | 4-tertiary-Butylaniline | reddish-tinged yellow |
| 1,3,3-Trimethyl-5-methoxy-2-methylene-2,3-dihydroindole | 4-tertiary-Butylaniline | golden-yellow |
| 1,3,3-Trimethyl-5-carbomethoxy-2-methylene-2,3-dihydroindole | 4-tertiary-Butylaniline | golden yellow |
| 1,3,3-Trimethyl-5-carboethoxy-2-methylene-2,3-dihydro- | 4-tertiary-Butylaniline | golden yellow |

Table-continued

| Dihydroindole | Aniline | Colour Shade |
|---|---|---|
| 1,3,3-Trimethyl-5-cyclohexyl-2-methylene-2,3-dihydroindole | 4-tertiary-Butylaniline | golden yellow |
| 1,3,3-Trimethyl-5-benzyl-2-methylene-2,3-dihydroindole | 4-tertiary-Butylaniline | reddish-tinged yellow |
| 1,3,3-Trimethyl-5-nitro-2-methylene-2,3-dihydroindole | 4-tertiary-Butylaniline | yellowish tinged orange |
| 1,3,3-Trimethyl-7-methyl-2-methylene-2,3-dihydroindole | 4-tertiary-Butylaniline | reddish-tinged yellow |
| 1,3,3-Trimethyl-5-trifluoromethyl-2-methylene-2,3-dihydroindole | 4-tertiary Butylaniline | reddish-tinged yellow |
| 1,3,3-Trimethyl-7-methoxy-2-methylene-2,3-dihydroindole | 4-tertiary-Butylaniline | reddish-tinged yellow |
| 1,3,3-Trimethyl-7-chloro-2-methylene-2,3-dihydroindole | 4-tertiary-Butylaniline | reddish-tinged yellow |
| 1,3,3-Trimethyl-5-chloro-2-methylene-2,3-dihydroindole | 4-tertiary-Butylaniline | golden yellow |
| 1-Ethyl-3,3-dimethyl-2-methylene-2,3-dihydroindole | 4-tertiary-Butylaniline | reddish-tinged yellow |
| 1-Ethyl-3,3-dimethyl-5-methyl-2-methylene-2,3-dihydroindole | 4-tertiary-Butylaniline | reddish-tinged yellow |
| 1-Ethyl-3,3-dimethyl-5-chloro-2-methylene-2,3-dihydroindole | 4-tertiary-Butylaniline | golden yellow |
| 1-Ethyl-3,3-dimethyl-5-methoxy-2-methylene-2,3-dihydroindole | 4-tertiary-Butylaniline | golden yellow |
| 1-Ethyl-3,3-dimethyl-5-carboethoxy-2-methylene-2,3-dihydroindole | 4-tertiary-Butylaniline | golden yellow |
| 1-Ethyl-3,3-dimethyl-5-cyclohexyl-2-methylene-2,3-dihydroindole | 4-tertiary-Butylaniline | golden yellow |
| 1-Ethyl-3,3-dimethyl-5-benzyl-2-methylene-2,3-dihydroindole | 4-tertiary-Butylaniline | golden yellow |
| 1-Ethyl-3,3-dimethyl-5-nitro-2-methylene-2,3-dihydroindole | 4-tertiary-Butylaniline | yellowish-tinged orange |
| 1,3,3-Trimethyl-7-benzyl-2-methylene-2,3-dihydroindole | 4-tertiary-Butylaniline | reddish-tinged yellow |
| Mixture of: 1,3,3-Trimethyl-4-methyl-2-methylene-2,3-dihydroindole and 1,3,3-trimethyl-6-methyl-2-methylene-2,3-dihydroindole | 4-tertiary-Butylaniline | reddish-tinged yellow |
| 1,3,3-Trimethyl-6,7-benzo-2-methylene-2,3,3',4',5',6'-hexahydroindole | 4-tertiary-Butylaniline | yellowish-tinged orange |
| 1,3,3-Trimethyl-5-fluoro-2-methylene-2,3-dihydroindole | 4-tertiary-Butylaniline | golden yellow |
| 1,3,3-Trimethyl-5-ethoxy-2-methylene-2,3-dihydroindole | 4-tertiary-Butylaniline | golden yellow |
| 1,3,3-Trimethyl-7-ethoxy-2-methylene-2,3-dihydroindole | 4-tertiary-Butylaniline | golden yellow |
| 1,3,3-Trimethyl-5-cyano-2-methylene-2,3-dihydroindole | 4-tertiary-Butylaniline | golden yellow |
| 1,3,3-Trimethyl-5-acetylamino-2-methylene-2,3-dihydroindole | 4-tertiary-Butylaniline | golden yellow |
| 1,3,3-Trimethyl-5-methylsulphonyl-2-methylene-2,3-dihydroindole | 4-tertiary-Butylaniline | golden yellow |
| 1,3,3-Trimethyl-5-phenylsulphonyl-2-methylene-2,3-dihydroindole | 4-tertiary-Butylaniline | golden yellow |
| 1,3-Dimethyl-3-ethyl-2-methylene-2,3-dihydroindole | 4-tertiary-Butylaniline | golden yellow |
| 1,3,3-Trimethyl-6,7-benzo-2-methylene-2,3-dihydroindole | 4-tertiary-Butylaniline | yellowish-tinged orange |
| 1,3,3-Trimethyl-5-sulphonamido-2-methylene-2,3-dihydroindole | 4-tertiary-Butylaniline | golden yellow |
| 1,3,3-Trimethyl-5-carbamido-2-methylene-2,3-dihydroindole | 4-tertiary-Butylaniline | golden yellow |
| 1,3,3-Trimethyl-5-carboxylic acid ethylanilide-2-methylene-2,3-dihydroindole | 4-tertiary-Butylaniline | golden yellow |
| 1,3,3-Trimethyl-7-ethyl-2-methylene-2,3-dihydroindole | 4-tertiary-Butylaniline | reddish-tinged yellow |
| 1,3,3-Trimethyl-5-chloro-7-methoxy-2-methylene-2,3-dihydroindole | 4-tertiary-Butylaniline | golden yellow |
| 1,3,3-Trimethyl-4-chloro-7-methoxy-2-methylene-2,3-dihydroindole | 4-tertiary-Butylaniline | golden yellow |
| 1,3,3-Trimethyl-4,6-dicarbomethoxy-2-methylene-2,3-dihydroindole | 4-tertiary-Butylaniline | golden yellow |
| 1,3,3-Trimethyl-4,5-dichloro-7-methoxy-2-methylene-2,3-dihydroindole | 4-tertiary-Butylaniline | golden yellow |
| 1,3,3-Trimethyl-5-chloro-4,7-dimethoxy-2-methylene-2,3-dihydroindole | 4-tertiary-Butylaniline | golden yellow |
| 1,3,3,4,5,7-Hexamethyl-2-methylene-2,3-dihydroindole | 4-tertiary-Butylaniline | reddish-tinged yellow |
| 1,3,3,4,6,7-Hexamethyl-2-methylene-2,3-dihydroindole | 4-tertiary-Butylaniline | reddish-tinged yellow |
| 1,3,3-Trimethyl-5-tertiary-butyl-2-methylene-2,3-dihydroindole | 4-Amino-4'-methyl-diphenyl-ether | golden yellow |
| 1,3,3-Trimethyl-5-tertiary-butyl-2-methylene-2,3-dihydroindole | 4-Amino-4'-ethyl-diphenyl ether | golden yellow |
| 1,3,3-Trimethyl-5-tertiary-butyl-2-methylene-2,3-dihydroindole | 4-Amino-4'-tert.-butyl-diphenyl-ether | golden yellow |
| 1,3,3-Trimethyl-5-tertiary-butyl-2-methylene-2,3-dihydroindole | 4-Amino-4'-cyclohexyl-diphenyl-ether | golden yellow |
| 1,3,3-Trimethyl-5-tertiary-butyl-2-methylene-2,3-dihydroindole | 4-Amino-2'-methyl-diphenyl-ether | golden yellow |
| 1,3,3-Trimethyl-5-tertiary-butyl-2-methylene-2,3-dihydroindole | 4-Amino-3'-methyl-diphenyl-ether | golden yellow |
| 1,3,3-Trimethyl-5-tertiary-butyl-2-methylene-2,3-dihydroindole | 4-Amino-4'-methoxy-diphenyl-ether | golden yellow |
| 1,3,3-Trimethyl-5-tertiary-butyl-2-methylene-2,3-dihydroindole | 4-Amino-3'-methoxy-diphenyl-ether | golden yellow |
| 1,3,3-Trimethyl-5-tertiary-butyl-2-methylene-2,3-dihydroindole | 4-Amino-4'-ethoxy-diphenyl-ether | golden yellow |
| 1,3,3-Trimethyl-5-tertiary-butyl-2-methylene-2,3-dihydroindole | 4-Aminophenyl-α-naphthyl-ether | golden yellow |
| 1,3,3-Trimethyl-5-tertiary-butyl-2-methylene-2,3-dihydroindole | 4-Aminophenyl-β-naphthyl-ether | golden yellow |
| 1,3,3-Trimethyl-5-tertiary-butyl-2-methylene-2,3-dihydroindole | 4-Amino-2',3',5'-trimethyl-ether | golden yellow |

Table-continued

| Dihydroindole | Aniline | Colour Shade |
|---|---|---|
| 1,3,3-Trimethyl-5-tertiary-butyl-2-methylene-2,3-dihydroindole | 4-Aminodiphenylmethane | golden yellow |
| 1,3,3-Trimethyl-5-tertiary-butyl-2-methylene-2,3-dihydroindole | Aniline | reddish-tinged yellow |
| 1,3,3-Trimethyl-5-tertiary-butyl-2-methylene-2,3-dihydroindole | p-Toluidine | reddish-tinged yellow |
| 1,3,3-Trimethyl-5-tertiary-butyl-2-methylene-2,3-dihydroindole | m-Toluidine | reddish-tinged yellow |
| 1,3,3-Trimethyl-5-tertiary-butyl-2-methylene-2,3-dihydroindole | o-Anisidine | yellow |
| 1,3,3-Trimethyl-5-tertiary-butyl-2-methylene-2,3-dihydroindole | o-Phenetidine | yellow |
| 1,3,3-Trimethyl-5-tertiary-butyl-2-methylene-2,3-dihydroindole | p-Phenetidine | golden yellow |
| 1,3,3-Trimethyl-5-tertiary-butyl-2-methylene-2,3-dihydroindole | 4-Aminoacetanilide | golden yellow |
| 1,3,3-Trimethyl-5-tertiary-butyl-2-methylene-2,3-dihydroindole | N-Benzoyl-p-phenylenediamine | golden yellow |
| 1,3,3-Trimethyl-5-tertiary-butyl-2-methylene-2,3-dihydroindole | 2,4-Dimethoxyaniline | golden yellow |
| 1,3,3-Trimethyl-5-tertiary-butyl-2-methylene-2,3-dihydroindole | 2,5-Dimethoxyaniline | golden yellow |
| 1,3,3-Trimethyl-5-tertiary-butyl-2-methylene-2,3-dihydroindole | 3,4-Dimethoxyaniline | orange |
| 1,3,3-Trimethyl-5-tertiary-butyl-2-methylene-2,3-dihydroindole | 2-Chloro-4-aminoanisole | golden yellow |
| 1,3,3-Trimethyl-5-tertiary-butyl-2-methylene-2,3-dihydroindole | 2,4,5-Trimethylaniline | reddish-tinged yellow |
| 1,3,3-Trimethyl-5-tertiary-butyl-2-methylene-2,3-dihydroindole | 2,3,5-Trimethylaniline | reddish-tinged yellow |
| 1,3,3-Trimethyl-5-tertiary-butyl-2-methylene-2,3-dihydroindole | 5-Amino-2-acetylamino anisole | orange |
| 1,3,3-Trimethyl-5-tertiary-butyl-2-methylene-2,3-dihydroindole | 6-Amino-3-methoxy-toluene | golden yellow |
| 1,3,3-Trimethyl-5-tertiary-butyl-2-methylene-2,3-dihydroindole | 3,4-Dicyanoaniline | golden yellow |
| 1,3,3-Trimethyl-5-tertiary-butyl-2-methylene-2,3-dihydroindole | p-Sulphanilic acid amide | golden yellow |
| 1,3,3-Trimethyl-5-tertiary-butyl-2-methylene-2,3-dihydroindole | 4-Aminobenzamide | golden yellow |
| 1,3,3-Trimethyl-5-tertiary-butyl-2-methylene-2,3-dihydroindole | 4-Chloroaniline | golden yellow |
| 1,3,3-Trimethyl-5-tertiary-butyl-2-methylene-2,3-dihydroindole | 4-Fluoroaniline | golden yellow |
| 1,3,3-Trimethyl-5-tertiary-butyl-2-methylene-2,3-dihydroindole | 1,2,3,4-Tetrahydro-5-aminonaphthalene | golden yellow |
| 1,3,3-Trimethyl-5-tertiary-butyl-2-methylene-2,3-dihydroindole | 4-Amino-2,5-diethoxy-benzoic acid anilide | orange |
| 1,3,3-Trimethyl-5-tertiary-butyl-2-methylene-2,3-dihydroindole | 4-Amino-2-methyl-5-methoxybenzanilide | yellowish-tinged orange |
| 1,3,3-Trimethyl-5-tertiary-butyl-2-methylene-2,3-dihydroindole | 4-Cyclohexylaniline | golden yellow |
| 1,3,3-Trimethyl-5-tertiary-butyl-2-methylene-2,3-dihydroindole | 2,4-Diethoxyaniline | golden yellow |
| 1,3,3-Trimethyl-5-tertiary-butyl-2-methylene-2,3-dihydroindole | 2-Aminonaphthalene | golden yellow |
| 1,3,3-Trimethyl-5-tertiary-butyl-2-methylene-2,3-dihydroindole | 3,4-Diisopropoxyaniline | golden yellow |

EXAMPLE 2

A fabric of anionically modified polyamide is dyed, in accordance with the procedure indicated in Example 1, in a bath which per liter of tetrachloroethylene contains 1 g of the dyestuff of the formula

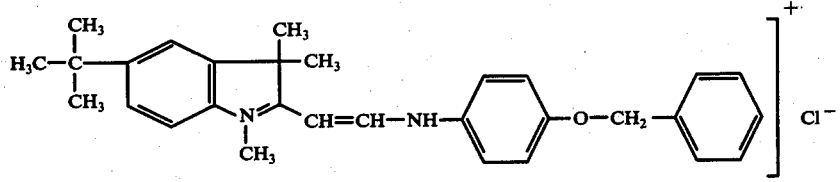

1 g of oleic acid ethanolamide, 1 g of the reaction product of 1 mol of oleyl alcohol with 20 mols of ethylene oxide, 8 g of water and 1 g of glacial acetic acid.

A level greenish-tinged yellow dyeing of good fastness properties is obtained.

The dyestuff had been manufactured as follows: 10 parts of 1,3,3-trimethyl-5-tertiary butyl-2-methylene-2,3-dihydroindol-ω-aldehyde and 7.8 parts of p-benzyloxyaniline were stirred with 15 parts by volume of glacial acetic acid and 5 parts of water for 4 hours at room temperature. The solution was subsequently diluted with 300 parts of water. After salting out with 20 parts by weight of sodium chloride, the dyestuff was separated from the solution.

Equivalent dyeings, in the colour shades indicated in the table, on the substrates indicated in the table were also obtained if instead of the dyestuff used the same amount of one of the dyestuffs obtained on reaction of the aldehydes and amines indicated in the table, under the manufacturing conditions described for the dyestuff used, was employed. (PA = anionically modified polyacrylonitrile, PE anionically modified polyester).

Table

| Aldehyde | Amine | Colour Shade | Substrate |
|---|---|---|---|
| 1,3,3-Trimethyl-2-methylene-2,3-dihydroindol-ω-aldehyde | p-tert.-Butylaniline | greenish-tinged yellow | PA |
| 1,3,3-Trimethyl-2-methylene-2,3-dihydroindol-ω-aldehyde | 4(p-tert.Butyl)-phenoxyaniline | yellow | PE |
| 1,3,3-Trimethyl-2-methylene-2,3-di- | p-Dodecyloxyaniline | yellow | PE |

Table-continued

| Aldehyde | Amine | Colour Shade | Substrate |
|---|---|---|---|
| 1,3,3-Trimethyl-2-methylene-2,3-dihydroindol-ω-aldehyde | p-Cyclohexylaniline | greenish-tinged yellow | PA |
| 1,3,3-Trimethyl-5-benzyloxy-2-methylene-2,3-dihydroindol-ω-aldehyde | p-tert.Butylaniline | greenish-tinged yellow | PA |
| 1,3,3-Trimethyl-5-tertiary-butyl-2-methylene-2,3-dihydroindol-ω-aldehyde | 2-Methyl-2,3-dihydro-indole | greenish-tinged yellow | PA |
| 1,3,3-Trimethyl-5-tertiary-butyl-2-methylene-2,3-dihydroindol-ω-aldehyde | p-Anisidine indole | greenish-tinged yellow | PA |
| 1,3,3-Trimethyl-5-tertiary-butyl-2-methylene-2,3-dihydroindol-ω-aldehyde | p-tert.-Butylaniline indole | greenish-tinged yellow | PA |
| 1,3,3-Trimethyl-2-methylene-2,3-dihydroindol-ω-aldehyde | p-i-Propoxyaniline | greenish-tinged yellow | PA |
| 1,3,3-Trimethyl-2-methylene-2,3-dihydroindol-ω-aldehyde | p-n-Butoxyaniline | greenish-tinged yellow | PA |
| 1,3,3-Trimethyl-2-methylene-2,3-dihydroindol-ω-aldehyde | p-i-Butoxyaniline | greenish-tinged yellow | PA |
| 1,3,3-Trimethyl-2-methylene-2,3-dihydroindol-ω-aldehyde | 4-t-Butoxyaniline | greenish-tinged yellow | PA |
| 1,3,3-Trimethyl-2-methylene-2,3-dihydroindol-ω-aldehyde | p-(2-Methylbutoxy aniline | greenish-tinged yellow | PA |
| 1,3,3-Trimethyl-2-methylene-2,3-dihydroindol-ω-aldehyde | p-n-Pentyloxy-aniline | greenish-tinged yellow | PA |
| 1,3,3-Trimethyl-2-methylene-2,3-dihydroindol-ω-aldehyde | p-n-Hexyloxy-aniline | greenish-tinged yellow | PA |
| 1,3,3-Trimethyl-2-methylene-2,3-dihydroindol-ω-aldehyde | p-[Hexyl-(2)-aniline | greenish-tinged yellow | PA |
| 1,3,3-Trimethyl-2-methylene-2,3-dihydroindol-ω-aldehyde | p-n-Heptyloxy-aniline | greenish-tinged yellow | PA |
| 1,3,3-Trimethyl-2-methylene-2,3-dihydroindol-ω-aldehyde | p-n-Octyloxy-aniline | yellow | PE |
| 1,3,3-Trimethyl-2-methylene-2,3-dihydroindol-ω-aldehyde | p-n-Nonyloxy-aniline | yellow | PE |
| 1,3,3-Trimethyl-2-methylene-2,3-dihydroindol-ω-aldehyde | p-n-Decyl-oxy-aniline | yellow | PE |
| 1,3,3-Trimethyl-2-methylene-2,3-dihydroindol-ω-aldehyde | p-n-Undecyloxyaniline | yellow | PE |
| 1,3,3-Trimethyl-2-methylene-2,3-dihydroindol-ω-aldehyde | p-[Heptyl-(3)-oxy]-aniline | greenish-tinged yellow | PA |
| 1,3,3-Trimethyl-5-n-butoxy-2-methylene-2,3-dihydroindol-ω-aldehyde | p-Anisidine | greenish-tinged yellow | PA |
| 1,3,3-Trimethyl-5-n-butoxy-2-methylene-2,3-dihydroindol-ω-aldehyde | 2-Methyl-2,3-dihydroindole | greenish-tinged yellow | PA |
| 1,3,3-Trimethyl-2-methylene-2,3-dihydroindol-ω-aldehyde | p-[Pentyl-(2)-oxy]-aniline | greenish-tinged yellow | PA |
| 1,3,3-Trimethyl-2-methylene-2,3-dihydroindol-ω-aldehyde | p-[Hexyl-(2)-oxy]-aniline | greenish-tinged yellow | PA |
| 1,3,3-Trimethyl-2-methylene-2,3-dihydroindol-ω-aldehyde | 2,3,3-Trimethyl-5-tert.-butyl-indoline | greenish-tinged yellow | PA |
| 1,3,3-Trimethyl-2-methylene-2,3-dihydroindol-ω-aldehyde | 2,3,3-Trimethyl-5-n-butoxy indoline | greenish-tinged yellow | PA |
| 1,3,3-Trimethyl-2-methylene-t-tert.-butyl-2,3-dihydroindol-ω-aldehyde | 2,3,3-Trimethyl-5-methoxy indoline | greenish-tinged yellow | PA |
| 1,3,3-Trimethyl-2-methylene-5-tert,-butyl-2,3-dihydroindol-ω-aldehyde | 2,3,3-Trimethyl-5-benzyloxy indoline | greenish-tinged yellow | PA |
| 1,3,3-Trimethyl-2-methylene-5.-tert.-butyl-2,3-dihydroindol-ω-aldehyde | 2,3,3-Trimethyl-5-phenoxy indoline | greenish-tinged yellow | PA |
| 1,3,3-Trimethyl-2-methylene-5-tert,-butyl-2,3-dihydroindol-ω-aldehyde | 2,3,3-Trimethyl-7-phenoxy indoline | greenish-tinged yellow | PA |
| 1,3,3-Trimethyl-5-tertiary-butyl-2-methylene-2,3-dihydroindol-ω-aldehyde | Aniline | greenish-tinged yellow | PA |
| 1,3,3-Trimethyl-5-tertiary-butyl-2-methylene-2,3-dihydroindol-ω-aldehyde | p-Toluidine | greenish-tinged yellow | PA |
| 1,3,3-Trimethyl-5-tertiary-butyl-2-methylene-2,3-dihydroindol-ω-aldehyde | m-Toluidine | greenish-tinged yellow | PA |
| 1,3,3-Trimethyl-5-tertiary-butyl-2-methylene-2,3-dihydroindol-ω-aldehyde | o-Anisidine | yellow | PA |
| 1,3,3-Trimethyl-5-tertiary-butyl-2-methylene-2,3-dihydroindol-ω-aldehyde | m-Anisidine | greenish-tinged yellow | PA |
| 1,3,3-Trimethyl-5-tertiary-butyl-2-methylene-2,3-dihydroindol-ω-aldehyde | o-Phenetidine | yellow | PA |
| 1,3,3-Trimethyl-5-tertiary-butyl-2-methylene-2,3-dihydroindol-ω-aldehyde | m-Phenetidine | greenish-tinged yellow | PA |
| 1,3,3-Trimethyl-5-tertiary-butyl-2-methylene-2,3-dihydroindol-ω-aldehyde | 4-Aminoacetanilide | greenish-tinged yellow | PA |
| 1,3,3-Trimethyl-5-tertiary-butyl-2-methylene-2,3-dihydroindol-ω-aldehyde | N-Benzoyl-p-phenylenediamine | greenish-tinged yellow | PA |
| 1,3,3-Trimethyl-5-tertiary-butyl-2-methylene-2,3-dihydroindol-ω-aldehyde | 2,4-Dimethoxyaniline | reddish-tinged yellow | PA |
| 1,3,3-Trimethyl-5-tertiary-butyl-2-methylene-2,3-dihydroindol-ω-aldehyde | 2,5-Dimethoxyaniline | reddish-tinged yellow | PA |
| 1,3,3-Trimethyl-5-tertiary-butyl-2-methylene-2,3-dihydroindol-ω-aldehyde | 3,4-Dimethoxyaniline | reddish-tinged yellow | PA |
| 1,3,3-Trimethyl-5-tertiary-butyl-2-methylene-2,3-dihydroindol-ω-aldehyde | 3,4-Diisopropoxyaniline | reddish-tinged yellow | PA |
| 1,3,3-Trimethyl-5-tertiary-butyl-2-methylene-2,3-dihydroindol-ω-aldehyde | 2-Chloro-4-aminoanisole | yellow | PA |
| 1,3,3-Trimethyl-5-tertiary-butyl-2-methylene-2,3-dihydroindol-ω-aldehyde | 2,4,5-Trimethylaniline | greenish-tinged yellow | PA |
| 1,3,3-Trimethyl-5-tertiary-butyl-2-methylene-2,3-dihydroindol-ω-aldehyde | 2,3,5-Trimethylaniline | greenish-tinged yellow | PA |
| 1,3,3-Trimethyl-5-tertiary-butyl-2-methylene-2,3-dihydroindol-ω-aldehyde | 5-Amino-2-acetylamino-anisole | reddish-tinged yellow | PA |

Table-continued

| Aldehyde | Amine | Colour Shade | Substrate |
|---|---|---|---|
| 1,3,3-Trimethyl-5-tertiary-butyl-2-methylene-2,3-dihydroindol-ω-aldehyde | 6-Amino-2-methoxy-toluene anisole | yellow | PA |
| 1,3,3-Trimethyl-5-tertiary-butyl-2-methylene-2,3-dihydroindol-ω-aldehyde | 3,4-Dicyanoaniline | yellow | PA |
| 1,3,3-Trimethyl-5-tertiary-butyl-2-methylene-2,3-dihydroindol-ω-aldehyde | p-Sulphanilic acid amide | yellow | PA |
| 1,3,3-Trimethyl-5-tertiary-butyl-2-methylene-2,3-dihydroindol-ω-aldehyde | 4-Amino-benzamide | yellow | PA |
| 1,3,3-Trimethyl-5-tertiary-butyl-2-methylene-2,3-dihydroindol-ω-aldehyde | 4-Chloroaniline | greenish-tinged yellow | PA |
| 1,3,3-Trimethyl-5-tertiary-butyl-2-methylene-2,3-dihydroindol-ω-aldehyde | 4-Fluoroaniline | greenish-tinged yellow | PA |
| 1,3,3-Trimethyl-5-tertiary-butyl-2-methylene-2,3-dihydroindol-ω-aldehyde | 1,2,3,4-Tetrahydro-5-amino-naphthalene | yellow | PA |
| 1,3,3-Trimethyl-5-tertiary-butyl-2-methylene-2,3-dihydroindol-ω-aldehyde | 4-Amino-2,5-diethoxy-N-4-Amino-2-methyl-5-methoxy-N-benzoylaniline | yellowish-tinged orange | PA |
| 1,3,3-Trimethyl-5-tertiary-butyl-2-methylene-2,3-dihydroindol-ω-aldehyde | | yellow | PA |
| 1,3,3-Trimethyl-5-tertiary-butyl-2-methylene-2,3-dihydroindol-ω-aldehyde | 4-Cyclohexylaniline | greenish-tinged yellow | PA |
| 1,3,3-Trimethyl-5-tertiary-butyl-2-methylene-2,3-dihydroindol-ω-aldehyde | 2,5-Diethoxyaniline | yellow | PA |
| 1,3,3-Trimethyl-5-tertiary-butyl-2-methylene-2,3-dihydroindol-ω-aldehyde | 2-Amino-naphthalene | yellow | PA |
| 1,3,3-Trimethyl-5-tertiary-butyl-2-methylene-2,3-dihydroindol-ω-aldehyde | 1,2,3,4-Tetrahydroquinoline | greenish-tinged yellow | PA |
| 1,3,3-Trimethyl-5-tertiary-butyl-2-methylene-2,3-dihydroindol-ω-aldehyde | Hexahydrocarbazole | yellow | PA |
| 1,3,3-Trimethyl-5-tertiary-butyl-2-methylene-2,3-dihydroindol-ω-aldehyde | 1,2,3,4-Tetrahydro-6-methoxy-quinoline | yellow | PA |
| 1,3,3-Trimethyl-5-tertiary-butyl-2-methylene-2,3-dihydroindol-ω | 4-Aminodiphenylmethane | greenish-tinged yellow | PA |
| 1,3,3-Trimethyl-5-tertiary-butyl-2-methylene-2,3-dihydroindol-ω-aldehyde | 4-Amino-4'-methyldiphenyl-methane | greenish-tinged yellow | PA |
| 1,3,3-Trimethyl-5-tertiary-butyl-2-methylene-2,3-dihydroindol-ω-aldehyde | 4-Aminodiphenyl-ether | greenish-tinged yellow | PA |
| 1,3,3-Trimethyl-5-tertiary-butyl-2-methylene-2,3-dihydroindol-ω-aldehyde | 2-Aminodiphenyl-ether | greenish-tinged yellow | PA |
| 1,3,3-Trimethyl-5-tertiary-butyl-2-methylene-2,3-dihydroindol-ω-aldehyde | 4-Amino-4'-methyl-diphenyl-ether | greenish-tinged yellow | PA |
| 1,3,3-Trimethyl-5-tertiary-butyl-2-methylene-2,3-dihydroindol-ω-aldehyde | 4-Amino-4'-ethyl-diphenyl-ether | greenish-tinged yellow | PA |
| 1,3,3-Trimethyl-5-tertiary-butyl-2-methylene-2,3-dihydroindol-ω-aldehyde | 4-Amino-4'-tertiary-butyl-diphenyl-ether | greenish-tinged yellow | PA |
| 1,3,3-Trimethyl-2-methylene-2,3-dihydroindol-ω-aldehyde | p-tertiary-Butylaniline | greenish-tinged yellow | PA |
| 1,3,3-Trimethyl-5-methyl-2-methylene-2,3-dihydroindol-ω-aldehyde | p-tertiary-Butylaniline | yellow | PA |
| 1,3,3-Trimethyl-5-methoxy-2-methylene-2,3-dihydroindol-ω-aldehyde | p-tertiary-Butylaniline | greenish-tinged yellow | PA |
| 1,3,3-Trimethyl-5-carbomethoxy-3-methylene-2,3-dihydroindol-ω-aldehyde | p-tertiary-Butylaniline | greenish-tinged yellow | PA |
| 1,3,3-Trimthyl-5-carboethoxy-2-methylene-2,3-dihydroindol-ω-aldehyde | p-tertiary-Butylaniline | greenish-tinged yellow | PA |
| 1,3,3-Trimethyl-5-cyclohexyl-2-methylene-2,3-dihydroindol-ω-aldehyde | p-tertiary-Butylaniline | greenish-tinged yellow | PA |
| 1,3,3-Trimethyl-5-benzyl-2-methylene-2,3-dihydroindol-ω-aldehyde | p-tertiary-Butylaniline | greenish-tinged yellow | PA |
| 1,3,3-Trimethyl-5-nitro-2-methylene-2,3-dihydroindol-ω-aldehyde | p-tertiary-Butylaniline | reddish-tinged yellow | PA |
| 1,3,3-Trimethyl-7-methyl-2-methylene-2,3-dihydroindol-ω-aldehyde | p-tertiary-Butylaniline | greenish-tinged yellow | PA |
| 1,3,3-Trimethyl-5-trifluoromethyl-2-methylene-2,3-dihydroindol-ω-aldehyde | p-tertiary-Butylaniline | greenish-tinged yellow | PA |
| 1,3,3-Trimethyl-7-methoxy-2-methylene-2,3-dihydroindol-ω-aldehyde | p-tertiary-Butylaniline | greenish-tinged yellow | PA |
| 1,3,3-Trimethyl-7-chloro-2-methylene-2,3-dihydroindol-ω-aldehyde | p-tertiary-Butylaniline | greenish-tinged yellow | PA |
| 1,3,3-Trimethyl-5-chloro-2-methylene-2,3-dihydroindol-ω-aldehyde | p-tertiary-Butylaniline | greenish-tinged yellow | PA |
| 1-Ethyl-3,3-dimethyl-2-methylene-2,3-dihydroindol-ω-aldehyde | p-tertiary Butylaniline | greenish-tinged yellow | PA |
| 1-Ethyl-3,3-dimethyl-5-methyl-2-methylene-2,3-dihydroindol-ω-aldehyde | p-tertiary Butylaniline | greenish-tinged yellow | PA |
| 1-Ethyl-3,3-dimethyl-5-chloro-2-methylene-2,3-dihydroindol-ω-aldehyde | M p-tertiary Butylaniline | greenish-tinged yellow | PA |
| 1-Ethyl-3,3-dimethyl-5-methoxy-2-methylene-2,3-dihydroindol-ω-aldehyde | p-tertiary Butylaniline | yellow | PA |
| 1-Ethyl-3,3-dimethyl-5-carboethoxy-2-methylene-2,3-dihydroindol-ω-aldehyde | p-tertiary Butylaniline | greenish-tinged yellow | PA |
| 1-Ethyl-3,3-dimethyl-5-cyclohexyl-2-methylene-2,3-dihydroindol-ω-aldehyde | p-tertiary Butylaniline | greenish-tinged yellow | PA |
| 1-Ethyl-3,3-dimethyl-5-benzyl-2-methylene-2,3-dihydroindol-ω-aldehyde | p-tertiary Butylaniline | greenish-tinged yellow | PA |
| 1-Ethyl-3,3-dimethyl-5-nitro-2-methylene-2,3-dihydroindol-ω-aldehyde | p-tertiary Butylaniline | reddish-tinged yellow | PA |
| 1,3,3-Trimethyl-7-benzyl-2-methylene-2,3-dihydroindol-ω-aldehyde | p-tertiary-Butylaniline | greenish-tinged yellow | PA |
| Mixture of: 1,3,3-Trimethyl-4-methyl-2-methylene-2,3-dihydroindol-ω-aldehyde and 1,3,3-trimethyl-6-methyl-2-methylene-2,3-dihydroindol-ω-aldehyde | p-tertiary-Butylaniline | greenish-tinged yellow | PA |
| 1,3,3-Trimethyl-6,7-benzo-2-methylene-2,3,3',4',5',6'-hexahydroindol-ω-aldehyde | p-tertiary-Butylaniline | reddish-tinged yellow | PA |

Table-continued

| Aldehyde | Amine | Colour Shade | Substrate |
|---|---|---|---|
| 1,3,3-Trimethyl-5-fluoro-2-methylene-2,3-dihydroindol-ω-aldehyde | p-tertiary-Butylaniline | greenish-tinged yellow | PA |
| 1,3,3-Trimethyl-5-ethoxy-2-methylene-2,3-dihydroindol-ω-aldehyde | p-tertiary-Butylaniline | yellow | PA |
| 1,3,3-Trimethyl-7-ethoxy-2-methylene-2,3-dihydroindol-ω-aldehyde | p-tertiary-Butylaniline | greenish-tinged yellow | PA |
| 1,3,3-Trimethyl-5-cyano-2-methylene-2,3-dihydroindol-ω-aldehyde | p-tertiary-Butylaniline | greenish-tinged yellow | PA |
| 1,3,3-Trimethyl-5-acetylamino-2-methylene-2,3-dihydroindol-ω-aldehyde | p-tertiary-Butylaniline | yellow | PA |
| 1,3,3-Trimethyl-5-methylsulphonyl-2-methylene-2,3-dihydroindol-ω-aldehyde | p-tertiary-Butylaniline | greenish-tinged yellow | PA |
| 1,3,3-Trimethyl-5-phenylsulphonyl-2-methylene-2,3-dihydroindol-ω-aldehyde | p-tertiary-Butylaniline | yellow | PA |
| 1,3-Dimethyl-3-ethyl-2-methylene-2,3-dihydroindol-ω-aldehyde | p-tertiary-Butylaniline | greenish-tinged yellow | PA |
| 1,3,3-Trimethyl-6,7-benzo-2-methylene-2,3-dihydroindol-ω-aldehyde | p-tertiary-Butylaniline | yellow | PA |
| 1,3,3-Trimethyl-5-sulphonamido-2-methylene-2,3-dihydroindol-ω-aldehyde | p-tertiary-Butylaniline | greenish-tinged yellow | PA |
| 1,3,3-Trimethyl-5-carbonamido-2-methylene-2,3-dihydroindol-ω-aldehyde | p-tertiary-Butylaniline | greenish-tinged yellow | PA |
| 1,3,3-Trimethyl-5-carboxylic acid ethyl anilide-2-methylene-2,3-dihydroindol-ω-aldehyde | p-tertiary-Butylaniline | greenish-tinged yellow | PA |
| 1,3,3-Trimethyl-7-ethyl-2-methylene-2,3-dihydroindol-ω-aldehyde | p-tertiary-Butylaniline | greenish-tinged yellow | PA |
| 1,3,3-Trimethyl-5-chloro-7-methoxy-2-methylene-2,3-dihydroindol-ω-aldehyde | p-tertiary-Butylaniline | greenish-tinged yellow | PA |
| 1,3,3-Trimethyl-4-chloro-7-methoxy-2-methylene-2,3-dihydroindol-ω -aldehyde | p-tertiary-Butylaniline | greenish-tinged yellow | PA |
| 1,3,3-Trimethyl-4,5-dichloro-7-methoxy-2-methylene-2,3-dihydroindol-ω-aldehyde | p-tertiary-Butylaniline | greenish-tinged yellow | PA |
| 1,3,3-Trimethyl-5-chloro-4,7-dimethoxy-2-methylene-2,3-dihydroindol-ω-aldehyde | p-tertiary-Butylaniline | greenish-tinged yellow | PA |
| 1,3,3-Trimethyl-4,6-dicarbomethoxy-2-methylene-2,3-dihydroindol-ω-aldehyde | p-tertiary-Butylaniline | greenish-tinged yellow | PA |
| 1,3,3,4,5,7-Hexamethyl-2-methylene-2,3-dihydroindol-ω-aldehyde | p-tertiary-Butylaniline | greenish-tinged yellow | PA |
| 1,3,3,4,6,7-Hexamethyl-2-methylene-2,3-dihydroindol-ω-aldehyde | p-tertiary-Butylaniline | greenish-tinged yellow | PA |
| 1,3,3-Trimethyl-2-methylene-5-tert.-butyl-2,3-dihydroindol-ω-aldehyde | 3-Amino-phenyl-benzyl-ether | greenish-tinged yellow | PA |
| 1,3,3-Trimethyl-2-methylene-5-tert.-butyl-2,3-dihydroindol-ω-aldehyde | 2-Amino-phenyl-benzyl-ether | greenish-tinged yellow | PA |
| 1,3,3-Trimethyl-2-methylene-5-tert.-butyl-2,3-dihydroindol-ω-aldehyde | 4-Aminophenyl-p-methyl-benzyl-ether | greenish-tinged yellow | PA |
| 1,3,3-Trimethyl-2-methylene-5-tert.-butyl-2,3-dihydroindol-ω-aldehyde | 3-Aminophenyl-p-methyl-benzyl-ether | greenish-tinged yellow | PA |
| 1,3,3-Trimethyl-2-methylene-5-tert.-butyl-2,3-dihydroindol-ω-aldehyde | 2-Aminophenyl-p-methyl-benzyl-ether | yellow | PA |
| 1,3,3-Trimethyl-2-methylene-5-tert.-butyl-2,3-dihydroindol-ω-aldehyde | 4-Amino-2-methylphenyl-benzyl-ether | yellow | PA |
| 1,3,3-Trimethyl-2-methylene-5-tert.-butyl-2,3-dihydroindol-ω-aldehyde | 5-Amino-2-methylphenyl-benzyl-ether | yellow | PA |
| 1,3,3-Trimethyl-2-methylene-5-tert.-butyl-2,3-dihydroindol-ω-aldehyde | 2-Amino-5-methylphenyl-benzyl-ether | yellow | PA |
| 1,3,3-Trimethyl-2-methylene-5-tert.-butyl-2,3-dihydroindol-ω-aldehyde | 4-Amino-2-methoxyphenyl-benzyl-ether | reddish-tinged yellow | PA |
| 1,3,3-Trimethyl-2-methylene-5-tert.-butyl-2,3-dihydroindol-ω-aldehyde | 4-Amino-3-methoxyphenyl-benzyl-ether | yellow | PA |
| 1,3,3-Trimethyl-2-methylene-5-tert.-butyl-2,3-dihydroindol-ω -aldehyde | 4-Amino-3-methylphenyl-benzyl-ether | yellow | PA |
| 1,3,3-Trimethyl-2-methylene-5-tert.-butyl-2,3-dihydroindol-ω-aldehyde | 4-Amino-4'-cyclohexyl-diphenyl-ether | yellow | PA |
| 1,3,3-Trimethyl-2-methylene-5-tert.-butyl-2,3-dihydroindol-ω-aldehyde | 4-Amino-2'-methyl-diphenyl-ether | yellow | PA |
| 1,3,3-Trimethyl-2-methylene-5-tert.-butyl-2,3-dihydroindol-ω-aldehyde | 4-Amino-3'-methyl-diphenyl-ether | yellow | PA |
| 1,3,3-Trimethyl-2-methylene-5-tert.-butyl-2,3-dihydroindol-ω-aldehyde | 4-Amino-4'-methoxy-diphenyl-ether | greenish-tinged yellow | PA |
| 1,3,3-Trimethyl-2-methylene-5-tert.-butyl-2,3-dihydroindol-ω-aldehyde | 4-Amino-3'-methoxy-diphenyl-ether | yellow | PA |
| 1,3,3-Trimethyl-2-methylene-5-tert.-butyl-2,3-dihydroindol-ω-aldehyde | 4-Amino-4'-ethoxy-diphenyl-ether | yellow | PA |
| 1,3,3-Trimethyl-2-methylene-5-tert.-butyl-2,3-dihydroindol-ω-aldehyde | 4-Amino-4'-acetylamino-diphenyl-ether | yellow | PA |
| 1,3,3-Trimethyl-2-methylene-5-tert.-butyl-2,3-dihydroindol-ω-aldehyde | 4-Amino-4'-hydroxy-diphenyl-ether | yellow | PA |
| 1,3,3-Trimethyl-2-methylene-5-tert.-butyl-2,3-dihydroindol-ω-aldehyde | 4-Aminophenyl-α-naphthyl-ether | greenish-tinged yellow | PA |
| 1,3,3-Trimethyl-2-methylene-5-tert.-butyl-2,3-dihydroindol-ω-aldehyde | 4-Aminophenyl-β-naphthyl-ether | greenish-tinged yellow | PA |
| 1,3,3-Trimethyl-2-methylene-5-tert.-butyl-2,3-dihydroindol-ω-aldehyde | 4-Amino-2',-3'-5'-trimethyldiphenyl-ether | yellow | PA |
| 1,3,3-Trimethyl-7-phenoxy-2-methylene-2,3-dihydroindol-ω-aldehyde | p-tertiary-Butylaniline | greenish-tinged yellow | PA |
| 1,3,3-Trimethyl-7-benzyloxy-2-methylene-2,3-dihydroindol-ω-aldehyde | p-tertiary-Butylaniline | greenish-tinged yellow | PA |
| 1,3,3-Trimethyl-5-phenoxy-2-methylene-2,3-dihydroindol-ω-aldehyde | p-tertiary-Butylaniline | greenish-tinged yellow | PA |
| 1,3,3-Trimethyl-5-benzyloxy-2-methyl- | p-tertiary-Butyl- | greenish-tinged yellow | PA |

Table-continued

| Aldehyde | Amine | Colour Shade | Substrate |
|---|---|---|---|
| lene-2,3-dihydroindol-ω-aldehyde | aniline | | |
| 1,3,3-Trimethyl-5-carbobenzoxy-2-methylene-2,3-dihydroindol-ω-aldehyde | p-tertiary-Butyl-aniline | greenish-tinged yellow | PA |

EXAMPLE 3

Dyeing is carried out as described in Example 1, but instead of the dyestuff described there the same amount of the dyestuff of the formula

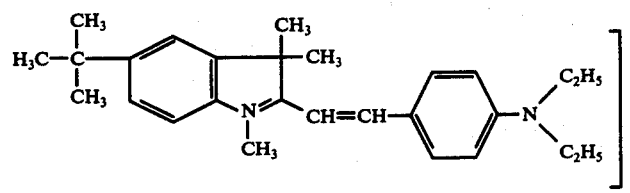

is used. A bluish-tinged red dyeing of uniform strength and excellent wet fastness propertie is obtained.

The dyestuff had been obtained as follows: 7 parts of 1,3,3-trimethyl-5-tertiary butyl-2-methylene-2,3-dihydroindole and 5.5 parts of 4-dimethylamino-benzaldehyde in 15 parts by volume of glacial acetic acid were stirred for 3 hours at 100° C. The dyestuff melt was then poured into 300 parts of water and the dyestuff was salted out with 20 parts of sodium chloride, separated from the solution and dried.

Equivalent dyeings, in the colour shades indicated in the table, were also obtained on polyacrylonitrile textile materials if instead of the dyestuff used the same amount of one of the dyestuffs obtained on reaction of 1,3,3-trimethyl-5tert.-butyl-2-methylene-2,3-dihydroindole with the aldehydes indicated in the table was employed.

Table

| Aldehyde | Colour shade |
|---|---|
| p-Dimethylamino-benzaldehyde | bluish-tinged red |
| p(2-Chloroethyl-butyl-amino)-benzaldehyde | red-violet |
| N-methyl-p-ethoxy-diphenylamine-(4)-aldehyde | reddish-tinged violet |
| N-ethylcarbazolaldehyde | orange |
| 1-Methyl-2-phenylindol-3-aldehyde | orange |
| 1-Methyl-2-phenyl-5-tertiary butyl-indol-3-aldehyde | orange |

Equivalent dyeings, in the colour shades indicated in the table, were also obtained on anionically modified polyacrylonitrile if instead of the dyestuff employed the same amount of one of the dyestuffs obtained on reaction of the aldehydes and dihydroindoles listed in the table, under the manufacturing condition described for the dyestuff used, was employed.

Table

| Aldehyde | Dihydroindole | Colour shade |
|---|---|---|
| 1-Methyl-2-phenyl-indol-3-aldehyde | 1,3,3-trimethyl-5-n-butyloxy-2-methylene-2,3-dihydroindole | orange |
| 1-n-Butyl-2-phenyl-indol-3-aldehyde | 1,3,3-trimethyl-5-tertiary butyl-2-methylene-2,3-dihydroindole | orange |
| 1-Isobutyl-2-phenyl-indol-3-aldehyde | 1,3,3-trimethyl-5-tertiary butyl-2-methylene-2,3-dihydroindole | orange |

EXAMPLE 4

A fabric of anionically modified polyester fibers (Dacron 64) is dyed, in accordance with the procedure indicated in Example 1, in a bath which per liter of tetrachloroethylene contains 1 g of the dyestuff of the formula

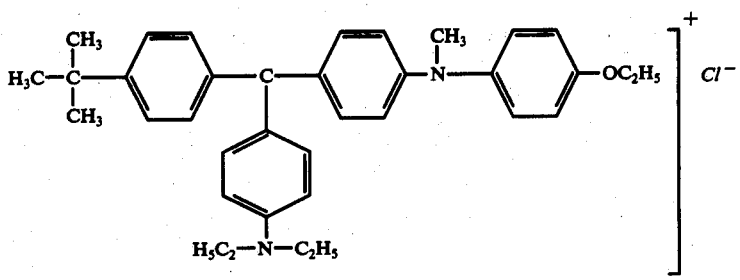

1 g of oleic acid ethanolamide, 1 g of the reaction product of 1 mol of oleyl alcohol with 20 mols of ethylene oxide, 8 g of water and 1 g of glacial acetic acid.

A uniform green dyeing of good wet fastness properties is obtained.

The dyestuff had been manufactured as follows: 15 parts of 4-diethylamino-4'-tert.-butyl-benzophenone, 11 parts of N-methyl-p-ethoxydiphenlamine and 30 parts of phosphorous oxychloride were stirred, 10 parts of phosphorus pentoxide were then added and the mixture was heated to 100° C for 2 hours. The melt was introduced into 500 parts of water, and stirred therein until the phosphorus oxychloride was decomposed. After adding 30 parts of sodium chloride, the dyestuff was filtered off.

If instead of 4-diethylamino-4'-tert.-butyl-benzophenone the equivalent amount of 4-phenylmethylamino-5-tertiary butylbenzophenone was employed, a dyestuff was obtained with which an even yellowish-tinged green dyeing also having excellent fastness properties was obtained.

EXAMPLE 5

A fabric of polyacrylonitrile fibres is dyed in accordance with the procedure described in Example 1 with the dyestuff of the formula Equivalent dyeings in the colour shades indicated in the table, on the substrates indicated in the table, were also obtained if instead of the dyestuff used the same amount of one of the dyestuffs obtained on reaction of the benzophenones and indoles indicated in the table, under the manufacturing conditions described for the dyestuff used, was employed (PA = anionically modified polyacrylonitrile, PE = anionically modified polyester).

Table

| Benzophenone | Indole | Colour shade | Substrate |
| --- | --- | --- | --- |
| 4-Diethylamino-4-tertiary-butyl-benzophenone | 1,2-Dimethylindole | strongly reddish-tinged blue | PA |
| 4-Di-n-propylamino-4-tertiary butyl-benzophenone | 1,2-Dimethylindole | reddish-tinged blue-grey | PE |
| 4-Di-n-propylamino-4-tertiary butyl-benzophenone | 1-Methyl-2-phenylindole | bluish-tinged grey-green | PE |
| 4-N-phenyl-N-methylamino-4-tertiary butyl-benzophenone | 1,2-Dimethylindole | reddish-tinged grey-blue | PE |
| 4-N-phenyl-N-methylamino-4-tertiary butyl-benzophenone | 1 Methyl-2-phenylindole | green | PE |
| 4-Diethylaminobenzophenone | 1-Ethyl-2-phenyl-5-tertiary butylindole | greenish-tinged blue | PE |
| 4-Diethylamino-2-chlorobenzophenone | 1-Ethyl-2-phenyl-5-tertiary butylindole | greenish-tinged blue | PE |
| 4-Phenylmethylamino-benzophenone | 1-Ethyl-2-phenyl-t-tertiary-butylindole | blue-green | PE |
| 4-Diethylamino-benzophenone | 1-Dodecyl-2-phenylindole | blue-grey | PE |
| 4,4'-Bis-diethylaminobenzophenone | 1-Dodecyl-2-phenylindole | reddish-tinged blue | PE |
| 4-Dimethylamino-4'-tertiary butyl-benzophenone | 1,2-Dimethylindole | strongly reddish-tinged blue | PA |
| 4-Dimethylamino-4'-tertiary butyl-benzophenone | 1-Methyl-2-phenylindole | greenish-tinged blue | PA |
| 4-Diethylamino-4'-methoxy-benzophenone | 1-Ethyl-2-phenyl-5-tert.-butylindole | black-grey | PE |
| 4-Dimethylamino-4'-methoxy-benzophenone | 1-Ethyl-2-phenyl-5-tert.-butylindole | reddish-tinged grey | PA |
| 4-N(p-Ethoxy-phenyl)N-methylamino-benzophenone | 1-Ethyl-2-phenyl-5-tert.-butylindole | green | PE |
| 4-Aminobenzophenone | 1-Ethyl-2-phenyl-5-tert.-butylindole | bluish-tinged red | PA |
| 4-Aminobenzophenone | 1-Dodecyl-2-phenylindole | claret | PE |

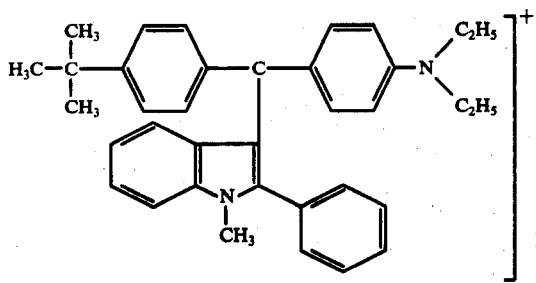

EXAMPLE 5

Polyacrylonitrile fibre yarn is dyed in accordance with the procedure indicated in Example 1 with the dyestuff of the formula

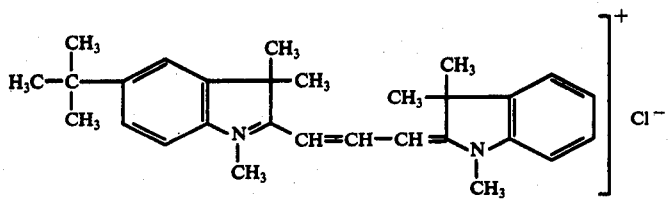

A uniform, blue-green dyeing of good fastness properties is obtained.

The dyestuff had been manufactured as follows: 15 parts of 4-tert.-butyl-4'-diethylamino-benzophenone, 10 parts of 1-methyl-2-phenylindole and 30 prts of phosphours oxychloride were stirred for 4 hours at 100° C. The melt was then poured into 400 parts of water and stirred until the phosphours oxychloride was decomposed. After adding 20 parts of sodium chloride, the dyestuff was filtered off and dried.

A bluish-tinged red dyeing of good wet fastness properties is obtained.

The dyestuff had been obtained by heating equimolar amounts of 1,3,3-trimethyl-5-t.-butyl-2-methylene-2,3-dihydroindol-ω-aldehyde and 1,3,3-trimethyl-2-methylene-2,3-dihydroindole, in the same amount by weight of a mixture of 75% of galcial acetic acid and 25% of acetic anhydride, to 100° C for 5 hours, subsequently stirring the mixtue with a 20-fold amount of water, and salting out with sodium chloride Equivalent dyeings, in the colour shades indicated in the table, were also obtaned if instead of the dyestuff used the same amount of one of the dyestuffs which are obtained in the reaction of the dihydroindoles indicated in the table with 1,3,3-trimethyl-5-tert.-butyl-2-methylene-2,3-dihydroindol-ω-aldehyde, under the manufacturing conditions described for the dyestuff used, was employed.

Table

| Dihydroindole | Colour shade |
| --- | --- |
| 1,3,3-Trimethyl-2-methylene-5-methoxy-ω-cyano-2,3-dihydroindole | bluish-tinged red |
| 1,3,3-Trimethyl-2-methylene-5-chloro-2,3-dihydroindole | bluish-tinged pink |
| 1,3,3-Trimethyl-2-methylene-5-methyl-2,3-dihydroindole | bluish-tinged red |
| 1,3,3-Trimethyl-2-methylene-5-cyano-2,3-dihydroindole | bluish-tinged pink |
| 1,3,3-Trimethyl-2-methylene-5-carbomethoxy-2,3-dihydroindole | bluish-tinged pink |
| 1,3,3-Trimethyl-2-methylene-5-methoxy-2,3-dihydroindole | bluish-tinged red |
| 1,3,3-Trimethyl-2-methylene-7-methyl-2,3-dihydroindole | bluish-tinged red |
| 1,3,3-Trimethyl-2-methylene-7-chloro-2,3-dihydroindole | bluish-tinged pink |
| 1,3,3-Trimethyl-2-methylene-5-tert.-butyl-2,3-dihydroindole | bluish-tinged red |
| 1,3,3-Trimethyl-2-methylene-5-methyl-sulphonyl-2,3-dihydroindole | bluish-tinged pink |
| 1,3,3-Trimethyl-2-methylene-5-nitro-2,3-dihydroindole | strongly bluish-tinged red |

I claim:

1. In the process of dyeing an anionically modified fiber material by exhaustion from a dyebath consisting essentially of a cationic dyestuff dissolved in halogenated hydrocarbon the improvement comprising the use as said cationic dyestuff a dyestuff soluble in said halogenated hydrocarbon and having the formula

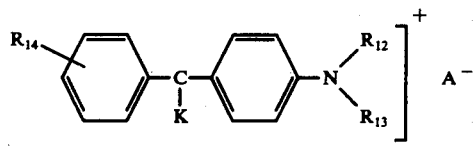

in which
A$^-$ is a non-lipophilic anion;
$R_{12}$ is hydrogen, alkyl, aralkkyl, cycloalkyl or aryl;
$R_{13}$ is hydrogen, alkyl, cycloalkyl or aralkyl, or $R_{12}$ and $R_{13}$ together with the nitrogen atom form a heterocyclic ring which can contain further heteroatoms;
$R_{14}$ is hydrogen, halogen, alkoxy, aralkoxy, aryloxy, acyloxy, alkyl, aralkyl, aryl, nitro, CN, trifluoromethyl, carboxylic acid ester, carbonamide, N-substituted carbonamide, acyl, alkysulphonyl or arylsulphonyl or K is or

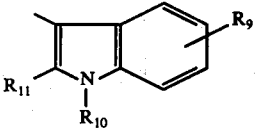

in which
$R_9$ is hydrogen, alkyl, alkoxy or halogen;
$R_{10}$ is hydrogen, alkyl, aralkyl, cycloalkyl or aryl;
$R_{11}$ is alkyl, aryl, carboxylic acid ester, carbonamide or substituted carbonamide;
$R_{15}$ is hydrogen, alkyl, cycloalkyl or aralkyl;
$R_{16}$ is hydrogen, alkyl, aralkyl, cycloalkyl or aryl; or $R_{15}$ and $R_{16}$, together with the nitrogen atom, form a heterocyclic ring which can contain further heteroatoms;
$R_{17}$ is hydrogen, halogen, alkyl or alkoxy, and in which
the aromatic carbocyclic rings of the dyestuff cation can be condensed with carbocyclic rings and additionally the substituents $R_9$, $R_{14}$ and $R_{17}$ can contan further non-ionic substituents;
with the proviso that at least one of the substituents $R_9$, $R_{11}$, $R_{14}$ or $R_{17}$ is a $C_3$-$C_{13}$-alkyl, $C_3$-$C_{12}$-alkoxy or $C_5$-$C_6$-cycloalkyl group or $R_{10}$ is a $C_3$-$C_{12}$-alkyl or $C_5$-$C_6$-cycloalkyl group.

2. Process according to claim 1 in which said dyebath also contains 0.1 to 4 percent by weight of water relative to the weight of the halogenated hydrocarbon.

3. Process of claim 1 in which said non-lipophilic anion is chloride, bromide, iodide, carbonate, bicarbonate, sulphate, bisulphate, disulphate, aminosulphonate, phosphate, dihydrogenophosphate, nitrate, perchlorate, $ZnCl_3^-$, p-chlorobenzenesulphonate, methylsulphate, ethylsulphate or the anion of formic acid, acetic acid, chloroacetic acid, propionic acid, lactic acid, crotonic acid, benzoic acid, oxalic acid, malonic acid, maleic acid, citric acid, tartaric acid, succinic acid, adipic acid or suberic acid.

* * * * *